(12) United States Patent
Sempel et al.

(10) Patent No.: US 6,324,233 B1
(45) Date of Patent: Nov. 27, 2001

(54) RECEPTION OF MODULATED CARRIERS HAVING ASYMMETRICAL SIDEBANDS

(75) Inventors: Adrianus Sempel; Eduard F. Stikvoort; Alphons A. M. L. Bruekers; Adrianus W. M. van den Enden; Rudy J. van de Plassche; Gerardus C. M. Gielis, all of Eindhoven (NL)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/120,625

(22) Filed: Jul. 22, 1998

(30) Foreign Application Priority Data

Jul. 25, 1997 (EP) .................................. 97202340

(51) Int. Cl.[7] .................. H04B 14/00; H04N 11/02
(52) U.S. Cl. ............................. 375/350; 348/425
(58) Field of Search ..................... 375/350, 277; 348/725, 726; 455/46, 47

(56) References Cited

U.S. PATENT DOCUMENTS

| | | | |
|---|---|---|---|
| 4,263,611 | * 4/1981 | Gibson et al. | 348/726 |
| 4,716,464 | * 12/1987 | Parker | 348/737 |
| 5,103,310 | * 4/1992 | Gibson et al. | 348/608 |
| 5,298,982 | 3/1994 | Lagoni | 348/713 |

FOREIGN PATENT DOCUMENTS

0609829A2   8/1994   (EP) .................... H04L/25/03

* cited by examiner

Primary Examiner—Chi Pham
Assistant Examiner—Khai Tran

(57) ABSTRACT

In a receiver for receiving a modulated carrier (MC) having asymmetrical sidebands (USB,LSB), for example, a TV signal, a synchronous demodulator (SDEM) derives a vectorial baseband signal (VB) from the modulated carrier (MC). A filter (FILT) filters the vectorial baseband signal so as to compensate for the sideband asymmetry, for example, by means of a Nyquist slope. Thus, the sideband asymmetry is compensated at baseband frequencies, rather than at an intermediate frequency, which allows a better quality of reception.

5 Claims, 8 Drawing Sheets

| $a_x$ | VAL[DEC] | VAL[CSD] |
|---|---|---|
| x= 0 | −0.0002441406250 | 0.00000000000T0 |
| 1 | 0.0000000000000 | 0.0000000000000 |
| 2 | −0.0009765625000 | 0.000000000T000 |
| 3 | 0.0000000000000 | 0.0000000000000 |
| 4 | −0.0024414062500 | 0.00000000T0T00 |
| 5 | 0.0000000000000 | 0.0000000000000 |
| 6 | −0.0052490234375 | 0.000000T010101 |
| 7 | 0.0000000000000 | 0.0000000000000 |
| 8 | −0.0100097656250 | 0.000000T0T00T0 |
| 9 | 0.0000000000000 | 0.0000000000000 |
| 10 | −0.0175781250000 | 0.00000T00T0000 |
| 11 | 0.0000000000000 | 0.0000000000000 |
| 12 | −0.0300292968750 | 0.0000T00001010 |
| 13 | 0.0000000000000 | 0.0000000000000 |
| 14 | −0.0513916015625 | 0.000T010T00T0T |
| 15 | 0.0000000000000 | 0.0000000000000 |
| 16 | −0.0976562500000 | 0.00T0100T00000 |
| 17 | 0.0000000000000 | 0.0000000000000 |
| 18 | −0.3126220703125 | 0.0T0T00000000T |
| 19 | 0.0000000000000 | 0.0000000000000 |
| 20 | 0.3126220703125 | 0.0101000000001 |
| 21 | 0.0000000000000 | 0.0000000000000 |
| 22 | 0.0976562500000 | 0.0010T00100000 |
| 23 | 0.0000000000000 | 0.0000000000000 |
| 24 | 0.0513916015625 | 0.00010T0100101 |
| 25 | 0.0000000000000 | 0.0000000000000 |
| 26 | 0.0300292968750 | 0.000010000T0T0 |
| 27 | 0.0000000000000 | 0.0000000000000 |
| 28 | 0.0175781250000 | 0.0000010010000 |
| 29 | 0.0000000000000 | 0.0000000000000 |
| 30 | 0.0100097656250 | 0.0000001010010 |
| 31 | 0.0000000000000 | 0.0000000000000 |
| 32 | 0.0052490234375 | 0.00000010T0T0T |
| 33 | 0.0000000000000 | 0.0000000000000 |
| 34 | 0.0024414062500 | 0.0000000010100 |
| 35 | 0.0000000000000 | 0.0000000000000 |
| 36 | 0.0009765625000 | 0.0000000001000 |
| 37 | 0.0000000000000 | 0.0000000000000 |
| 38 | 0.0002441406250 | 0.0000000000010 |

FIG. 7a

RECEPTION OF MODULATED CARRIERS HAVING ASYMMETRICAL SIDEBANDS

BACKGROUND OF THE INVENTION

1. Field of the Invention

The invention relates to reception of a modulated carrier having asymmetrical sidebands. An example of such a modulated carrier is a television (TV) signal for conventional terrestrial broadcasts.

2. Description of the Related Art

French Patent FR-A 2,656,187 mentions that, in a TV receiver, a specific type of filtering, called Nyquist filtering has to be carried out at an intermediate frequency in order to restore the integrity of the video spectrum after demodulation. This filtering ensures that the sidebands, which are asymmetrical, will always add up to "1".

FR-A 2,656,187 also describes a prior-art TV receiver. In the prior-art TV receiver, a desired TV signal is converted in frequency to an intermediate-frequency signal. The intermediate-frequency signal passes a Nyquist filter, after which it is demodulated by means of a carrier which is extracted from the intermediate-frequency signal prior to any processing thereof, in particular prior to any filtering.

SUMMARY OF THE INVENTION

The invention seeks, inter alia, to provide reception of a modulated carrier having asymmetrical sidebands which, with respect to the background art, allows a better quality of reception.

This object is achieved in a receiver for receiving a modulated carrier having asymmetrical sidebands, characterized in that the receiver comprises a synchronous demodulator for deriving a vectorial baseband signal from the modulated carrier; and a filter for filtering the vectorial baseband signal so as to compensate for the sideband asymmetry.

This object is also achieved in a method of receiving, and in an integrated circuit forming the above receiver.

The invention takes the following aspects into consideration. A full compensation of a sideband asymmetry can be achieved only if the frequency characteristic of the filter, which has to compensate for the sideband asymmetry, is precisely positioned with respect to the modulated carrier. For example, in the case of TV reception, the modulated carrier should be located exactly halfway the relevant slope of the Nyquist filter. If the sideband asymmetry is compensated at an intermediate frequency, as in the background art, this will not be possible because the relevant filter, as well as a tuner which carries out the frequency conversion, will suffer front tolerances, temperature dependency and ageing.

In accordance with the invention, a synchronous demodulator derives a vectorial baseband signal from the modulated carrier, and a filter filters the vectorial baseband signal so as to compensate for the sideband asymmetry. The synchronous demodulator effectively converts the modulated carrier in frequency to exactly "zero" frequency, independent of the frequency of the modulated carrier. The vectorial baseband signal, which is derived from the modulated carrier, allows a filtering which is asymmetrical with respect to zero frequency and, therefore, allows compensation of the sideband asymmetry. The filtering can be very precise near zero frequency, even if filter components suffer from tolerances, temperature dependency, ageing and the like. As a result, the sideband asymmetry can be compensated with greater precision than in the background art. Consequently, the invention allows a better quality of reception.

The invention may be used in, for example, a TV receiver. In that case, a Nyquist-filter compensation of the sideband asymmetry is carried out at baseband frequencies after the modulated carrier has been synchronously demodulated, rather than at an intermediate frequency. Consequently, the modulated carrier itself does not need to be subjected to any type of Nyquist filtering which may otherwise cause unwanted phase modulation. As the modulated carrier is substantially free of unwanted phase modulation, any carrier recovery as part of the synchronous demodulation may be of a wide-band nature. A wide-band carrier recovery allows the synchronous demodulator to respond relatively quickly to any changes in the input signal it receives. Such changes may occur, for example, during search tuning in which the synchronous demodulator may receive various signals in succession. The quicker the synchronous demodulator responds, the quicker this succession of various signals may be and, consequently, the greater the speed at which the search tuning may be carried out. Thus, the invention allows a relatively fast search tuning.

The invention may also be used in, for example, a multi-standard TV receiver. In some TV standards, the upper sideband of the modulated carrier is complete and the lower sideband is truncated, whereas the opposite applies to other TV standards. Thus, in a multi-standard receiver, two different Nyquist slopes should be available: one which is negative and another which is positive. In the invention, the two different Nyquist slopes may be obtained by using only one filter by changing the sign of one of the orthogonal components of the vectorial signal, as a result of which, positive frequencies become negative frequencies, and vice versa. In contradistinction, in the background art, a multi-standard application would require two different filters, one providing a negative Nyquist slope and another providing a positive slope. Thus, the invention allows a relatively hardware-efficient, and thus cost-efficient, implementation of a multi-standard TV receiver.

The invention may be wholly or partially implemented as an integrated circuit. Since, in the invention, the filter which compensates for the sideband asymmetry operates at baseband frequencies, rather than at an intermediate frequency as in the background art, it will require relatively few external components or even none at all. As has been mentioned hereinbefore, any carrier recovery as part of the synchronous demodulation may be of a wide-band nature, so that it will also require relatively few external components or even none at all. For example, the carrier recovery may be carried out by a phase-locked loop having a relatively large loop bandwidth, such that any noise of the controllable oscillator will be effectively suppressed. This allows the use of, for example, an RC-type oscillator which is relatively noisy but can be realised without any external components. Thus, the invention allows an integrated-circuit implementation which has relatively few external components and is therefore uncomplicated and cost-efficient.

The invention and additional features, which may be optionally used to implement the invention to advantage, are apparent from and will be elucidated with reference to the drawings described hereinafter.

BRIEF DESCRIPTION OF THE DRAWINGS

FIGS. 5a to 5d relate to an implementation of the FIG. 4 receiver for conventional terrestrial television reception, in which:

FIG. 5a is a graph illustrating a suitable amplitude-frequency characteristic of an intermediate frequency filter;

FIG. 5b is a circuit diagram illustrating an example of a baseband-frequency filter having a Nyquist slope for compensating the sideband asymmetry;

FIG. 5c is a circuit diagram illustrating an example of a delay equalizer in the FIG. 5b filter;

FIG. 5d shows graphs illustrating measured amplitude-frequency characteristics of an integrated-circuit implementation of the FIG. 5b filter;

FIG. 7a is a table listing an example of suitable coefficients for compensating the sideband asymmetry at baseband frequencies.

DESCRIPTION OF THE PREFERRED EMBODIMENTS

First, some remarks will be made on the use of reference signs. Similar entities are denoted by an identical letter-code throughout the drawings. In a single drawing, various similar entities may be shown. In that case, a numeral is added to the letter-code, to distinguish similar entities from each other. The numeral will be between parentheses if the number of similar entities is a running parameter. In the descriptions, any numeral in a reference sign may be omitted if this is appropriate.

Figure 1:
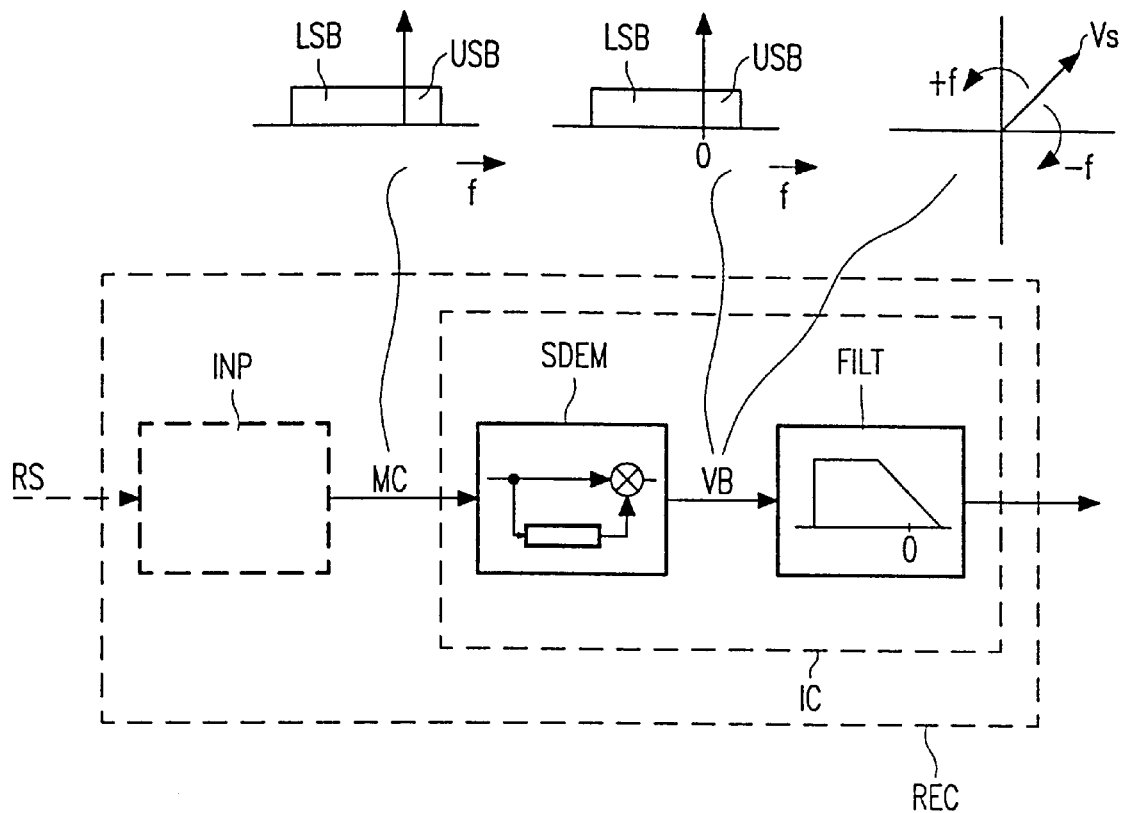
FIG. 1 is a conceptual diagram of a receiver in accordance with of the invention.

FIG. 1 illustrates basic features of the invention in solid lines. A modulated carrier MC has asymmetrical sidebands LSB,USB. A synchronous demodulator SDEM derives a vectorial baseband signal VB from the modulated carrier MC. The vectorial baseband signal VB is effectively the modulated carrier MC but then shifted in frequency to exactly "zero" frequency. A filter FILT filters the vectorial baseband signal VB so as to compensate for the asymmetry between the sidebands LSB,USB. Thus, the filter FILT has a frequency characteristic which is asymmetrical with respect to zero frequency. This is possible because the vectorial baseband signal VB allows a distinction between positive and negative frequencies. FIG. 1 illustrates a signal vector Vs representing a state of the vectorial baseband signal VB at a certain time. A counter-clockwise rotation of the signal vector Vs can be regarded as a positive frequency +f, and a clockwise rotation as a negative frequency −f.

FIG. 1 also illustrates the following features in broken lines. The synchronous demodulator SDEM and the filter FILT may form part of a receiver REC. The receiver REC may include input circuitry INP for deriving the modulated carrier MC from a reception signal RS. The synchronous demodulator SDEM and the filter FILT may wholly or partially form part of an integrated circuit IC.

Figure 2:
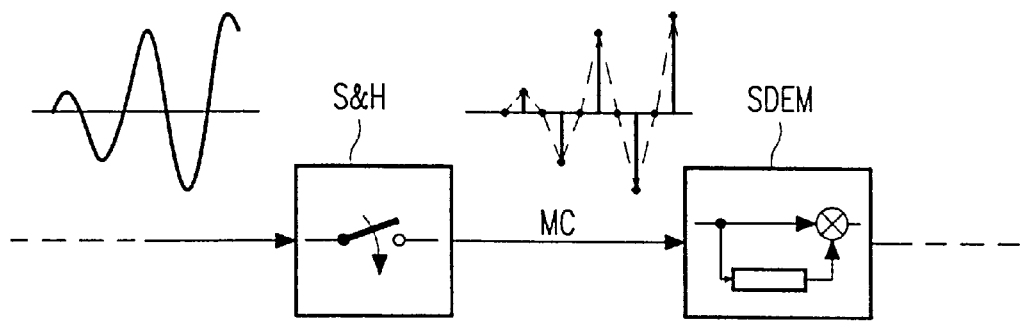
FIGS. 2 and 3 are conceptual diagrams showing modifications for the receiver of FIG. 1.

FIG. 2 illustrates the following additional feature. A sampling circuit S&H is provided for supplying the modulated carrier MC to the synchronous demodulator SDEM in a time-discrete form. The FIG. 2 feature takes the following aspects into consideration. In practice, the synchronous SDEM demodulator will provide two output signals which, in combination, will form the vectorial baseband signal. If the two signals are not precisely mutually orthogonal, a perfect distinction between positive and negative frequencies cannot be made. This will adversely affect the extent to which sideband asymmetry can be compensated and, hence, the quality of reception.

If the FIG. 2 feature is applied, the synchronous demodulator SDEM may operate in a time-discrete manner. This allows it to derive the vectorial baseband signal from the modulated carrier with relatively great precision. That is, it is capable of providing mutual orthogonality between the two signals forming the vectorial baseband signal with relatively great precision. This allows the filter to compensate for sideband asymmetry to a relatively large extent. Thus, the FIG. 2 feature contributes to the quality of reception.

Figure 3:
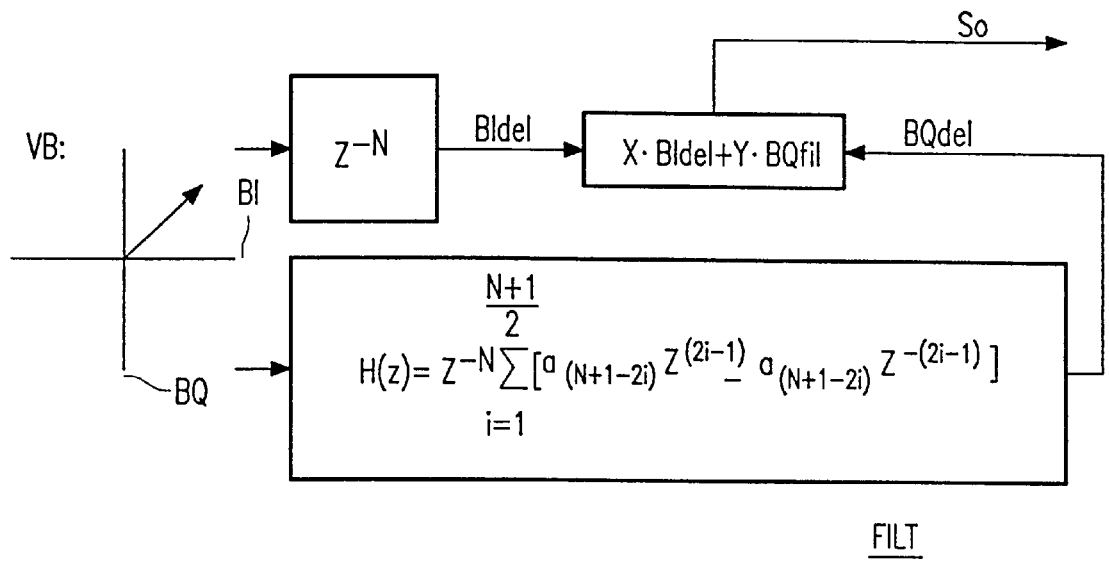

FIG. 3 illustrates the following additional feature. The filter FILT filters a component BQ of the vectorial baseband signal VB which corresponds to a phase-quadrature modulation component of the modulated carrier MC in accordance with an anti-symmetrical finite impulse response H(z) having alternately zero coefficients. This response H(z) may be generically expressed in the Z-domain as:

$$H(z) = z^{-N} \sum_{i=1}^{\frac{N+1}{2}} [a_{(N+1-2i)} z^{(2i-1)} - a_{(N+1-2i)} z^{-(2i-1)}]$$

N being an odd integral value. In writing, this generic expression yields the following result:

$$H(z) = a_0 + \ldots + a_{(N-3)} z^{-(N-3)} + a_{(N-1)} z^{-(N-1)} - a_{(N-1)} z^{-(N+1)} - a_{(N-3)} z^{-(N+3)} - \ldots a_0 z^{-2N}$$

The filter FILT also delays a component BI of the vectorial baseband signal VB which corresponds to an in-phase modulation component of the modulated carrier MC to an extent $z^{-N}$ which corresponds to the point of anti-symmetry in the anti-symmetrical finite impulse response H(z). The filter FILT makes a linear combination of the filtered component BQfil and the delayed component BIdel of the vectorial baseband signal VB. The linear combination forms an output signal So=x·BIdel+y·BQfil, x and y being scaling factors having a real value which may be one (1).

If the FIG. 3 feature is applied, the filter FILT will have an amplitude-frequency characteristic which satisfies the following condition:

$$|H(e^{j(-\theta)})|+|H(e^{j(+\theta)})|=k$$

θ representing the normalized frequency and k being a constant having a real value. Furthermore, the filter FILT will have a phase-frequency characteristic which is linear. As it has these characteristics, the filter FILT will add up any component of a sideband with the corresponding component of the other sideband to a constant value. Thus, a substantially perfect compensation of sideband asymmetry is achieved, irrespective of the values of the filter coefficients $a_0, \ldots a_{N-3}, a_{N-1}$. The only things that matter are that the response H(z) is anti-symmetrical and has coefficients which are alternately zero. Thus, the filter coefficients $a_0, \ldots a_{N-3}, a_{N-1}$ may be formed by sums of integral powers of two, in which the integer may be positive or negative. A filter having such coefficients can be implemented in a hardware-efficient manner and thus in a cost and power-efficient manner. Furthermore, the fact that coefficients are alternately zero also contributes to hardware-efficiency. Thus, the FIG. 3 feature allows a substantially perfect compensation of sideband asymmetry, and thus contributes to quality of reception, at low costs and modest power consumption.

Figure 4:
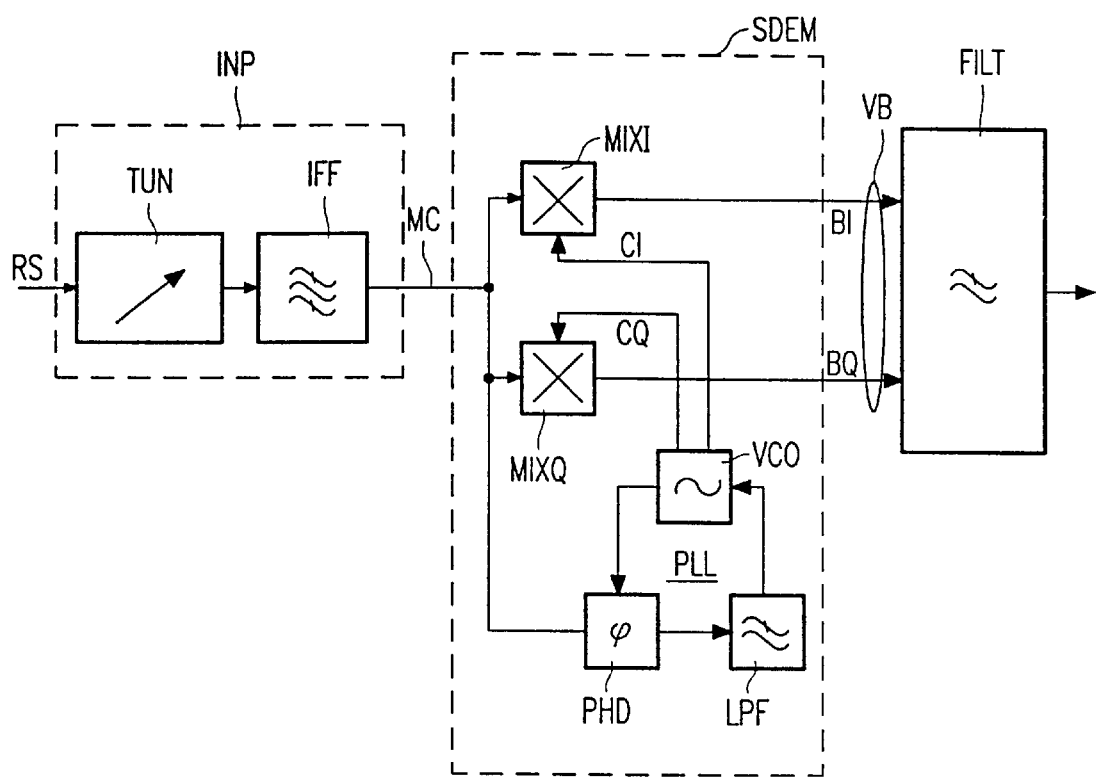
FIG. 4 is a block diagram of a first example of a receiver in accordance with the invention.

FIG. 4 illustrates an example of a receiver in accordance with the invention which includes the features shown, and described with reference to FIG. 1. In the FIG. 4 receiver, the input circuitry INP comprises a tuner TUN and an intermediate-frequency filter IFF. The synchronous demodulator SDEM is formed by mixer circuits MIXI, MIXQ and a phase-locked loop PLL which comprises a phase detector PHD, a loop filter LPF and a voltage controlled oscillator VCO.

The FIG. 4 receiver operates as follows. The tuner TUN shifts a reception signal RS, which comprises a modulated carrier, in frequency so that the modulated carrier falls within the passband of the intermediate-frequency filter IFF. Thus, the tuner TUN and the intermediate-frequency filter IFF, in combination, effectively select the modulated carrier MC which is supplied to the synchronous demodulator SDEM. The phase-locked loop PLL extracts two mixing carriers CI,CQ from the modulated carrier MC. Mixing carrier CI is in phase with the modulated carrier MC, whereas mixing carrier CQ is in phase-quadrature. Thus, mixing carriers CI,CQ are mutually orthogonal. They are supplied to the mixer circuits MIXI, MIXQ, respectively, both of which receive the modulated carrier MC. In response, the mixer circuits MIXI, MIXQ provide components BI, BQ which correspond to an in-phase and to a phase-quadrature modulation component, respectively, of the modulated carrier MC. In combination, the components BI, BQ form the vectorial signal VB which is filtered in the filter FILT so as to compensate for any sideband asymmetry in the modulated carrier MC.

Figure 5A:
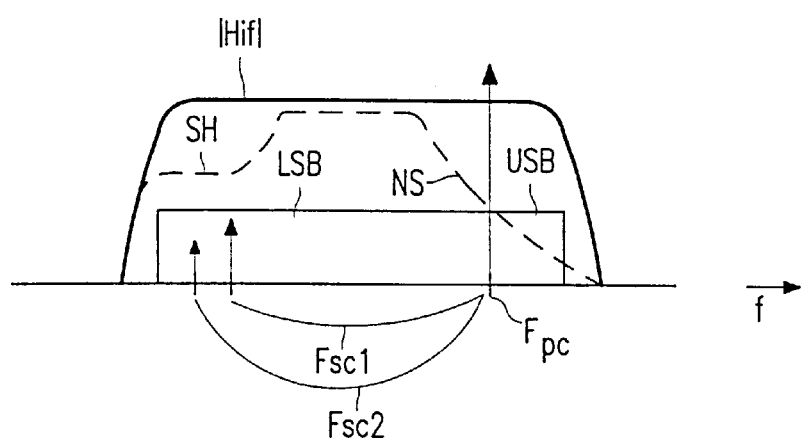

FIGS. 5a to 5d relate to an implementation of the FIG. 4 receiver for conventional terrestrial television reception. FIG. 5a illustrates in solid lines an example of a suitable amplitude-frequency characteristic |Hif| for the intermediate-frequency filter IFF which may be, for example, of the surface-acoustic wave (SAW) type. In FIG. 5a, Fpc denotes the frequency of the modulated carrier which, in the field of television reception, is commonly referred to as picture carrier. The upper sideband USB of the modulated carrier is truncated, whereas the lower sideband LSB is complete and comprises two sound carriers at frequencies Fsc1, Fsc2 relative to the modulated carrier. The amplitude-frequency characteristic |Hif| is substantially flat throughout the portion of the frequency spectrum which is occupied by the modulated carrier. FIG. 5a also illustrates in broken lines an example of a typical amplitude-frequency characteristic of an intermediate-frequency filter in present-day television receivers. This characteristic is not substantially flat because it comprises a Nyquist slope NS for compensating sideband asymmetry, and a sound shelf SH to somewhat reduce the amplitude of the sound carriers.

Figure 5D:
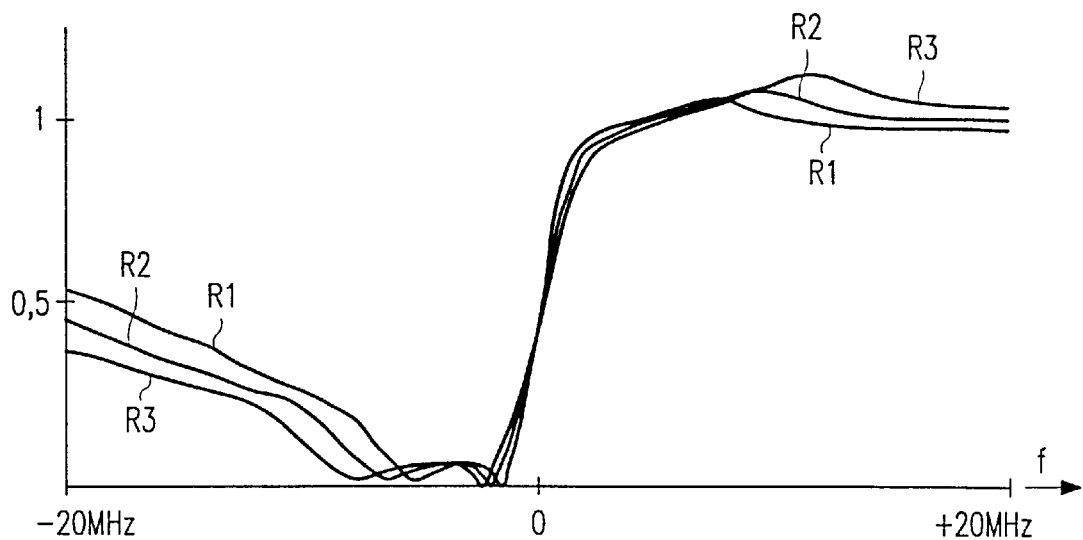
Figure 5B:
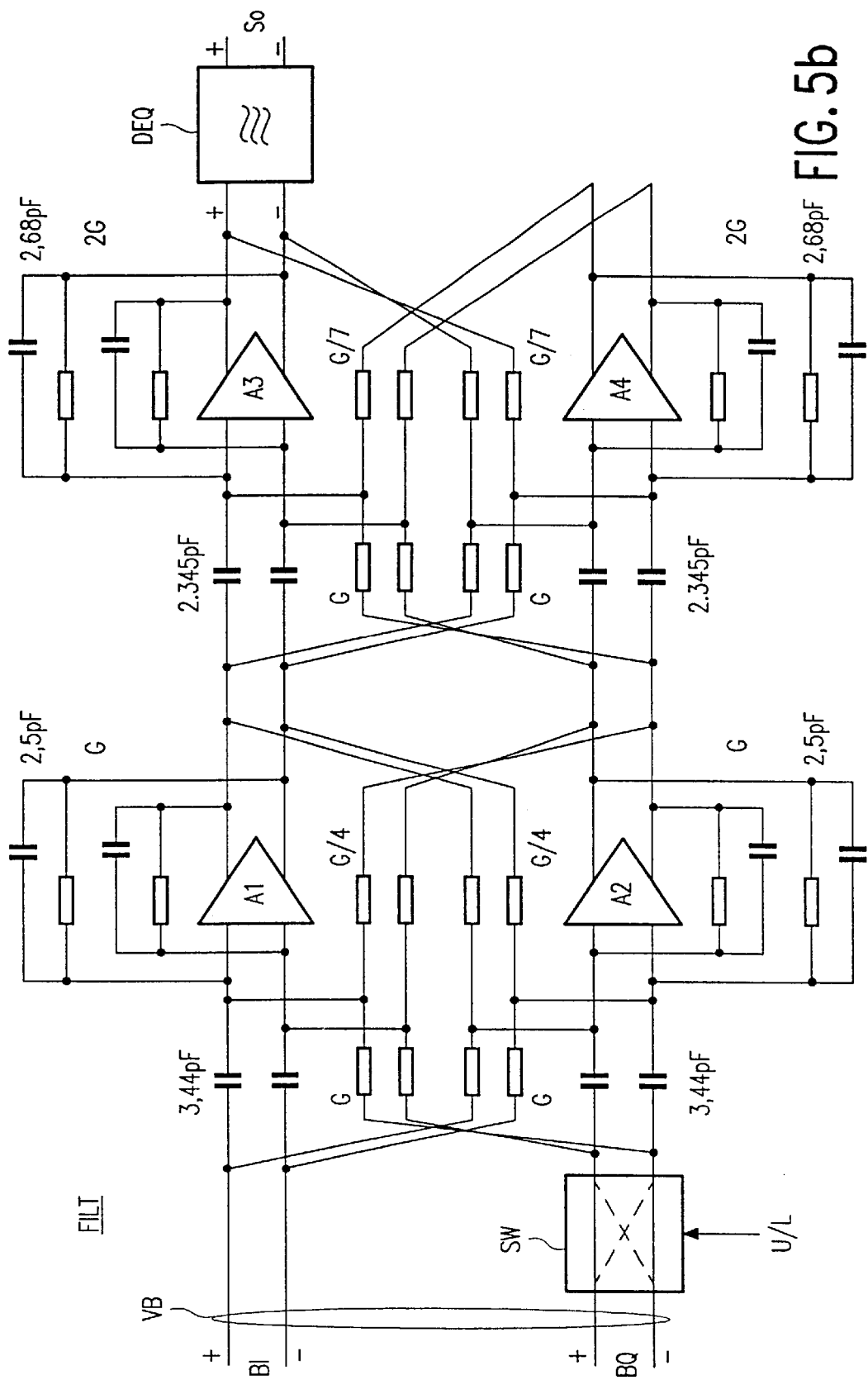

FIG. 5b illustrates an example of an implementation of the filter FILT which provides a Nyquist slope at baseband frequencies. It receives the components BI,BQ of the vectorial baseband signal VB in a differential form, which is indicated by plus (+) and minus (−) signs. The FIG. 5b filter comprises four balanced amplifiers A1 . . . A4 which are provided with pairs of capacitances and pairs of conductances—or resistances—whose values determine the frequency response of the filter. In FIG. 5b, a suitable value is given for each capacitances pair. The values of the pairs of conductances are expressed in terms of a unit conductance G. A suitable frequency response is obtained when the unit conductance G has a value of, for example, 20 μS (microSiemens) which corresponds to a resistance of 50 kΩ.

The FIG. 5b filter further comprises a switch SW which can change the sign of the component BQ in response to a control signal U/L. By changing the sign of the component BQ with respect to that of the component BI, or vice versa, a negative and a positive Nyquist slope can be obtained. Some television systems require a negative Nyquist slope, whereas others require a positive Nyquist slope. Thus, the switch SW allows multi-standard reception in an economical manner. The FIG. 5b filter also comprises a delay equalizer DEQ to compensate for any group-delay variations as a function of frequency. Accordingly, a substantially constant group delay is obtained over the baseband frequency range of interest.

Figure 5C:
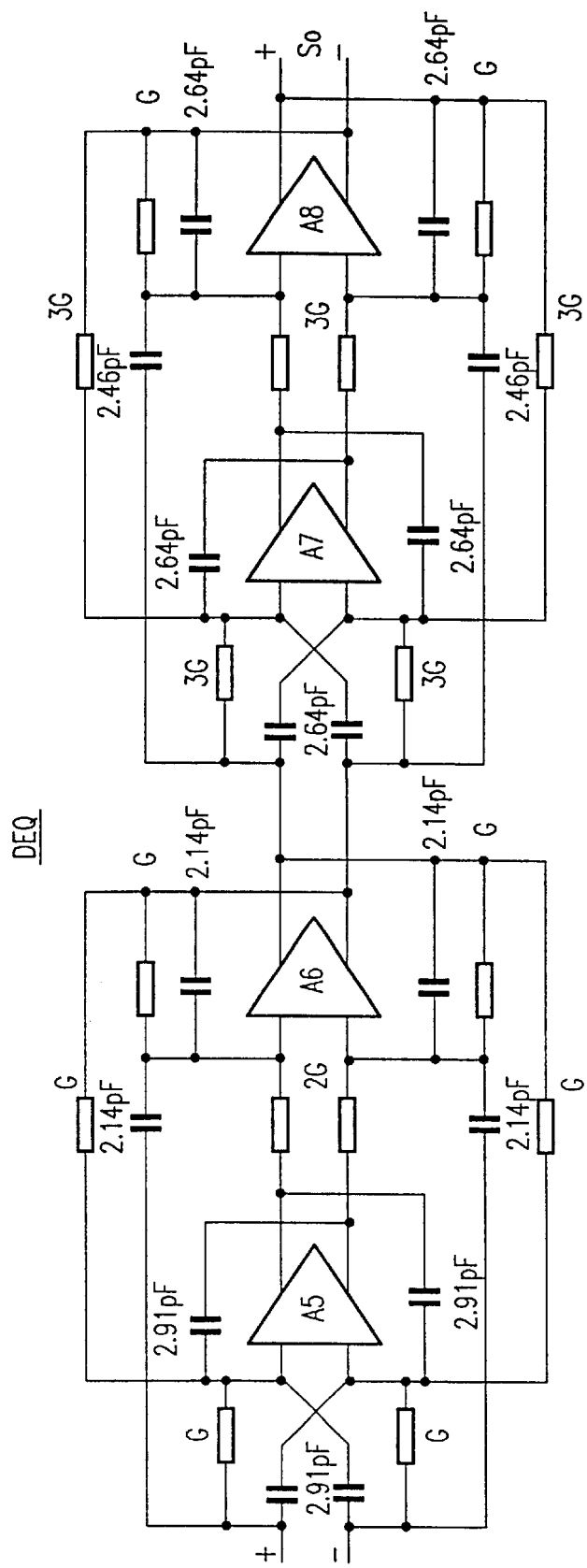

FIG. 5c illustrates an implementation of the delay equalizer DEQ. It comprises four differential amplifiers A5 . . . A8 which are provided with capacitances and conductances. In FIG. 5c, a suitable value is given for each capacitance. The values of the conductances are expressed in terms of the unit conductance G mentioned hereinbefore in connection with the FIG. 5b filter.

In order to counter any component inaccuracies, it is preferred that the conductances shown in FIGS. 5b and 5c are controllable while maintaining the ratios between the conductances as indicated in FIG. 5b. That is, the unit conductance G is preferably varied, for example between 10 μS and 40 μS. This can be achieved, for example, by implementing the conductances by means of field-effect transistors. In that case, the unit conductance G may be varied by means of a control voltage supplied to the gates of the field-effect transistors. The ratio between the conductances may be determined by the dimensions of the gates in terms of width and length. European Patent Application No. 97200345.3, U.S. patent application Ser. No. 09/017,917, filed Feb. 3, 1998 describes a suitable implementation of transconductances by means of field-effect transistors.

FIG. 5d shows three measured amplitude-frequency characteristics R1, R2 and R3 of an experimental integrated-circuit implementation of the FIG. 5b filter provided with the FIG. 5c delay equalizer. The conductances are realized by means of field-effect transistors as described hereinbefore. Each amplitude-frequency characteristic R1, R2 and R3 has been obtained with a different control voltage supplied to the gates of the field-effect transistors.

Figure 6:
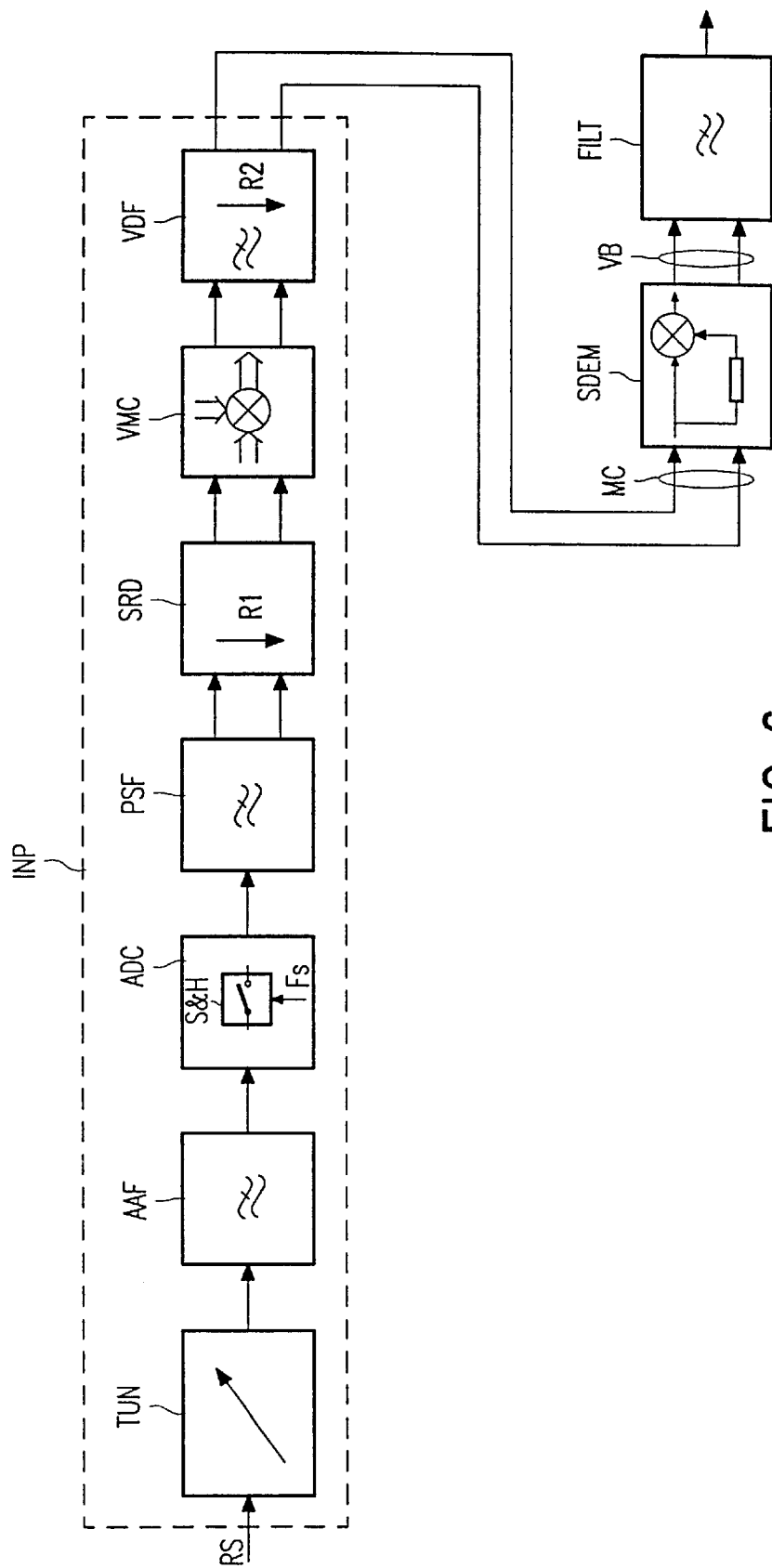
FIG. 6 is a block diagram of a second example of a receiver in accordance with the invention.

FIG. 6 illustrates a second example of a receiver in accordance with the invention which includes the features shown in, and described with reference to FIGS. 1 to 3. In the FIG. 6 receiver, the input circuitry INP is formed by a tuner TUN, an anti-aliasing filter AAF, an analog-to-digital converter ADC comprising a sampling circuit S&H, a phase-splitting filter PSF, a sample-rate decreaser SRD, a vectorial mixer circuit VMC, and a vectorial decimating filter VDF. The synchronous demodulator SDEM and the filter FILT are formed by digital circuitry.

The FIG. 6 receiver operates as follows. The tuner TUN shifts the reception signal RS, which comprises a modulated carrier, in frequency so that the modulated carrier is at a desired intermediate frequency. The anti-aliasing filter AAF counters aliasing effects due to a sampling at a frequency Fs carried out by the analog-to-digital converter ADC. The analog-to-digital converter ADC ensures that the modulated carrier MC is supplied to the synchronous demodulator SDEM in a digital form. The phase-splitting filter PSF provides a scalar-to-vectorial conversion so that the modulated carrier MC is supplied to the synchronous demodulator SDEM in a vectorial form. It also counters aliasing effects due to a sample-rate reduction carried out by the sample-rate decreaser SRD. PCT Patent Application WO-A-96/8078, corresponding to U.S. Pat. No. 5,784,414 describes a suitable manner of achieving anti-aliasing by means of a phase-splitting filter.

The vectorial mixer circuit VMC shifts the modulated carrier from the intermediate frequency to another frequency which has such a value that the modulated carrier falls with the passband of the vectorial decimating filter VDF. The vectorial decimating filter VDF suppresses any other signals which are adjacent in frequency to the modulated carrier. Thus, in effect, the tuner TUN, the vectorial mixer circuit VMC and the vectorial decimating filter VDF, in combination, select the modulated carrier MC which is supplied to the synchronous demodulator SDEM. As it were, the vectorial mixer circuit VMC and the vectorial decimating filter VDF have taken over the function of the intermediate-frequency filter IFF in the FIG. 4 receiver. European Patent Application No. EP-A 486,095 corresponding to U.S. Pat. No. 5,230,011 describes a receiver which comprises a Cordic processor and low-pass filters connected behind it. These elements may be used as suitable implementations of the vectorial mixing circuit VMC and the vectorial decimating filters VDF, respectively.

The FIG. 6 receiver may be used, for example, for multi-standard reception. Different standards may use different intermediate frequencies, different bandwidths and/or different sideband asymmetries, each requiring a particular filter characteristic. In the FIG. 6 receiver, the frequency shift carried out by the vectorial mixer circuit VMC, which is a digital circuit, can be programmed in accordance with the intermediate frequency of the relevant standard. For example, if the vectorial mixer circuit VMC is implemented as a Cordic processor, this may be achieved by suitably programming a z-data generator which is coupled to the Cordic processor. Furthermore, the passband of the vectorial decimating filters VDF can be programmed in accordance with the bandwidth of the relevant standard. Finally, the filter FILT can be programmed in accordance with the sideband asymmetry of the relevant standard.

The FIG. 6 receiver has the following advantage in multi-standard applications. In conventional multi-standard receivers, various intermediate-frequency filters are used to accommodate different intermediate frequencies, different bandwidths and/or different sideband asymmetries. Intermediate-frequency filters are relatively expensive, in particular in TV applications which generally use intermediate-frequency filters of the surface-acoustic wave type. The FIG. 6 receiver does not require various intermediate-frequency filters because the vectorial mixer circuit VMC, the vectorial decimating filter VDF and the filter FILT can be programmed for processing in accordance with a particular standard. Furthermore, the aforementioned elements can be realized in an integrated-circuit form at reasonable costs. Thus, the FIG. 6 receiver allows cost-efficient, multi-standard reception.

The FIG. 6 receiver has the following further advantage. In conventional TV receivers, channel selectivity is generally provided by an intermediate-frequency filter of the surface-acoustic wave type. Such a filter attenuates any signal within its passband to a relatively large extent. To compensate for this signal attenuation, a tuner in front of the filter needs to provide a relatively high gain. The FIG. 6 receiver does not require an intermediate-frequency filter of the surface acoustic wave type because it comprises digital circuits which provide channel selectivity. As a result, the tuner TUN does not need to provide a relatively high gain. This allows the tuner TUN to have a relatively good performance in terms of signal distortion and large-signal handling. Thus, the FIG. 6 receiver allows a relatively good quality of TV reception.

The following is an illustration of using the FIG. 6 receiver for TV reception. If TV reception in accordance with the PAL BIG standard is required, the tuner TUN will provide the modulated carrier at an intermediate frequency of 38.9 MHz. Subsequent to an analog-to-digital conversion, a scalar-to-vectorial conversion and a sample-rate reduction, the vectorial mixer circuit VMC shifts the modulated carrier 35.65 MHz in frequency from 38.9 MHz to 3.25 MHz. Thus, the vectorial mixer circuit VMC shifts the modulated carrier in frequency to such an extent that it will occupy a frequency spectrum which is substantially centred around zero (0) frequency. The vectorial decimating filters VDF have a low-pass characteristic and provide channel selectivity.

For multi-standard TV reception, it is preferred that the sampling frequency Fs of the analog-to-digital converter ADC is at least several times the width of a frequency range covering intermediate frequencies which belong to different TV standards. This allows the anti-aliasing filter AAF to have a fairly simple structure. For example, the sampling frequency Fs may be 216 MHz. The sample-rate decreaser SRD may reduce it by a factor of two, and the vectorial decimating filter VDF may further reduce it by a factor of 8, in which case the synchronous demodulator SDEM will receive the modulated carrier MC at a sample rate of 13.5 MHz.

FIG. 7a is a table listing an example of suitable coefficients for the anti-symmetrical finite impulse response H(z) in accordance with which the component BQ of the vectorial baseband signal VB is filtered as illustrated in FIG. 3. The column entitled VAL[DEC] gives the values of the coefficients in decimal notation, and the column entitled VAL [CSD] in canonical signed digit notation. With reference to FIG. 3, the component BI of the vectorial baseband signal is delayed by an amount corresponding to 19 sample periods which corresponds to the operation $z^{-19}$ in the Z-domain. It is scaled by a factor of 0.4951171875, which in CSD-notation is 0.1000000T0T, and then summed with the filtered component BQ. Thus, the following linear combination of filtered component BQfill and the delayed baseband signal BIdel is made to form the output signal So: So=0.4951171875·Idel+1·Qfil.

Figure 7B:
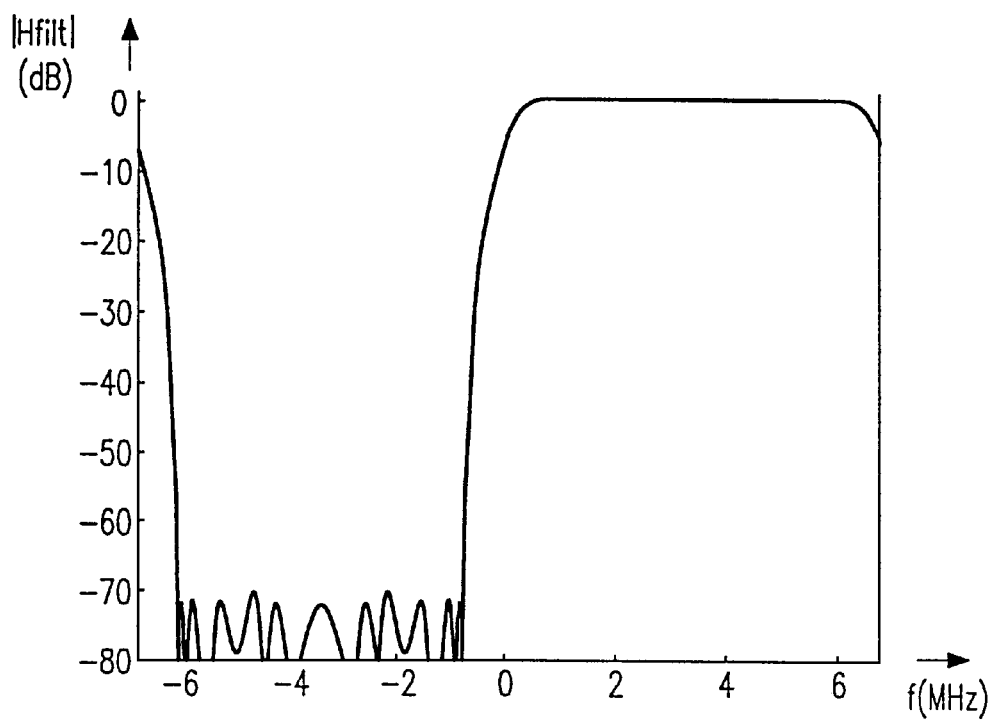
FIGS. 7b and 7c are graphs showing a frequency response of a filter with the FIG. 7a coefficients.
Figure 7C:
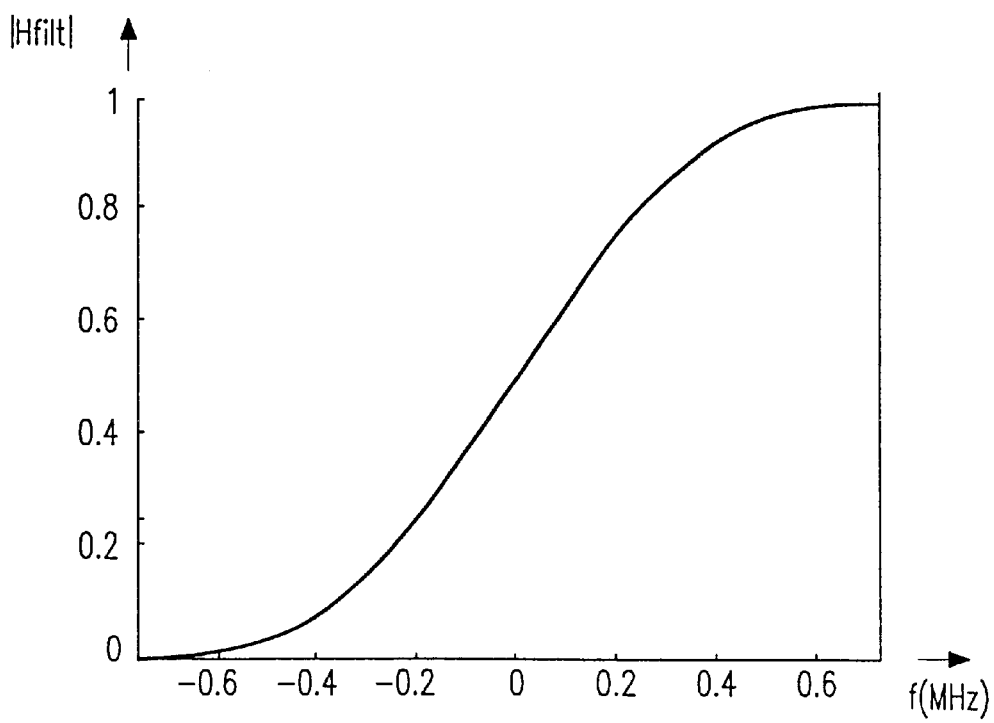

FIG. 7b shows a frequency response of the filter FILT when implemented as described hereinbefore with reference to FIG. 7a, and operating at a sample rate of 13.5 MHz. FIG. 7b is a graph in which frequency is linearly plotted on the horizontal axis, and in which the magnitude |Hfilt| of the frequency response is logarithmically plotted in dB (decibel) on the vertical axis. FIG. 7c shows the same response but in a different manner. FIG. 7c zooms in on zero (0) frequency to show a Nyquist slope in the response in more detail. Furthermore, in FIG. 7c, the magnitude |Hfilt| of the frequency response is linearly plotted on the vertical axis, instead of logarithmically as in FIG. 7b.

CLOSING REMARKS

The drawings and their description hereinbefore illustrate rather than limit the invention. It will be evident that there are numerous alternatives which fall within the scope of the appended claims. In this respect, the following closing remarks are made.

There are numerous ways of physically spreading functions or functional elements over various units. In this respect, the drawings are very diagrammatic, each representing only one possible embodiment of the invention. For example, with reference to FIG. 1, the input circuitry INP may be wholly or partially included in the integrated circuit IC. In another example, with reference to FIG. 4, the intermediate-frequency filter IFF may be incorporated in the tuner TUN.

It should also be noted that various functions or functional elements may be implemented by means of a suitably programmed computer, either individually or in combination. For example, with reference to FIG. 6, the filter FILT may be implemented in the form of a signal processor which operates in accordance with the features illustrated in, and described with reference to FIG. 3. Furthermore, the synchronous demodulator SDEM may also be realized in the same signal processor.

In principle, any type of input circuit may be used. For example, with reference to FIGS. 4 and 6, the tuner TUN may be omitted if a frequency conversion is not required. Furthermore, the tuner TUN may be a single conventional TV tuner such as, for example, the commercially available Philips TV tuner UV916H. It may also be a parallel-arrangement of various conventional TV tuners, or a tuner specifically designed for global multi-standard TV reception. In another example, with reference to FIG. 6, the vectorial mixer circuit VMC and the vectorial decimating filters VDF may be omitted. In that case, the modulated carrier MC will be supplied to the synchronous demodulator SDEM at the same frequency as that provided by the tuner TUN.

In principle, any type of synchronous demodulator may be used. For example, in the FIG. 6 receiver, the synchronous demodulator SDEM may be based on a Cordic processor, rather than on discrete mixer circuits as in the FIG. 4 receiver. In another example, with reference to FIG. 4, a filter-limiter combination may be used instead of the phase-locked loop PLL so as, to derive the two mixing carriers CI,CQ from the modulated carrier MC.

In principle, any type of filter may be used to compensate for the sideband asymmetry. With reference to the FIG. 4 receiver, the filter FILT may be realized as a switched-capacitor filter instead of an analog filter as illustrated in FIG. 5b. In that case, the filter FILT may be implemented with the features illustrated in, and described with reference to FIG. 3.

What is claimed is:

1. A receiver for receiving a modulated carrier having asymmetrical sidebands, characterized in that the receiver comprises:

a synchronous demodulator for deriving a vectorial baseband signal from the modulated carrier; and a filter for filtering the vectorial baseband signal to compensate for the sideband asymmetry.

2. A receiver as claimed in claim 1, characterized in that said receiver further comprises a sampling circuit for supplying the modulated carrier to the synchronous demodulator in a time-discrete form.

3. A receiver as claimed in claim 2, characterized in that the filter comprises:

a filter device that is configured to filter a first component of the vectorial baseband signal corresponding to a phase-quadrature modulation component of the modulated carrier in accordance with an anti-symmetrical finite impulse response having alternately zero coefficients;

a delay device that is configured to delay a second component of the vectorial baseband signal corresponding to an in-phase modulation component of the modulated carrier to an extent which corresponds to the point of anti-symmetry in the anti-symmetrical finite impulse response; and a linear combiner that is configured to combine the filtered first component and the delayed second component of the vectorial baseband signal thereby forming a linear combination output signal.

4. A method of receiving a modulated carrier (MC) having asymmetrical sidebands, characterized in that the method comprises the steps:

deriving a vectorial baseband signal from the modulated carrier by synchronous demodulation; and filtering the vectorial baseband signal to compensate for the sideband asymmetry.

5. An integrated circuit for processing a modulated carrier having asymmetrical sidebands, characterized in that the integrated circuit comprises:

a synchronous demodulator for deriving a vectorial baseband signal from the modulated carrier; and a filter for filtering the vectorial baseband signal to compensate for the sideband asymmetry.

* * * * *